United States Patent
Lüneburg

(10) Patent No.: US 8,261,616 B2
(45) Date of Patent: Sep. 11, 2012

(54) METHOD FOR TESTING ROTORS

(75) Inventor: Bernd Lüneburg, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 475 days.

(21) Appl. No.: 12/309,545

(22) PCT Filed: Jun. 25, 2007

(86) PCT No.: PCT/EP2007/056305
§ 371 (c)(1),
(2), (4) Date: Dec. 9, 2009

(87) PCT Pub. No.: WO2008/012153
PCT Pub. Date: Jan. 31, 2008

(65) Prior Publication Data
US 2010/0089136 A1   Apr. 15, 2010

(30) Foreign Application Priority Data
Jul. 25, 2006   (EP) ..................... 06015495

(51) Int. Cl.
*G01M 15/14* (2006.01)
(52) U.S. Cl. .............. 73/660; 73/112.01; 73/814
(58) Field of Classification Search ........... 73/112.01, 73/862.191, 814, 847, 660, 662; 702/56; 318/696
See application file for complete search history.

(56) References Cited

U.S. PATENT DOCUMENTS

| | | | | |
|---|---|---|---|---|
| 4,283,957 A * | 8/1981 | Zobrist et al. | ............ | 73/814 |
| 5,206,816 A * | 4/1993 | Hill et al. | ............ | 702/56 |
| 5,303,681 A * | 4/1994 | Crofts | ............ | 123/192.1 |
| 5,955,674 A * | 9/1999 | McGovern et al. | ............ | 73/650 |
| 6,065,344 A   | 5/2000 | Nolan et al. | | |
| 6,102,144 A * | 8/2000 | Lutz | ............ | 180/65.25 |
| 6,128,959 A * | 10/2000 | McGovern et al. | ............ | 73/660 |
| 6,314,342 B1 * | 11/2001 | Kramer et al. | ............ | 701/1 |
| 7,213,461 B2 * | 5/2007 | Hurley et al. | ............ | 73/662 |
| 7,292,917 B2 * | 11/2007 | Kuang et al. | ............ | 701/22 |
| 7,471,057 B2 * | 12/2008 | Clary | ............ | 318/683 |

FOREIGN PATENT DOCUMENTS
DE   10344802 A1   4/2005

OTHER PUBLICATIONS

Bai Mingsian R et al. "Development of an on-line diagnosis system for rotor vibration via model-based intelligent inference"; Journal of the acoustical society of America; Melville, NY, US; vol. 107, Nr. 1, Jan. 2000, S. 315-323; XP012001432; ISSN: 0001-4966: Others.

* cited by examiner

*Primary Examiner* — J M Saint Surin

(57) ABSTRACT

A method for testing rotors is disclosed, wherein a rotor to be tested is coupled in a torque-transmitting manner to an activating motor and is set in rotation. Vibrations of the rotor to be tested are measured, wherein the activating motor is operated such that torsional excitations are generated in the rotor.

12 Claims, 2 Drawing Sheets

METHOD FOR TESTING ROTORS

CROSS REFERENCE TO RELATED APPLICATIONS

This application is the US National Stage of International Application No. PCT/EP2007/056305 filed Jun. 25, 2007 and claims the benefit thereof. The International Application claims the benefits of European application No. 06015495.2 EP filed Jul. 25, 2006. Both of the applications are incorporated by reference herein in their entirety.

FIELD OF INVENTION

The invention relates to a method for testing rotors, wherein a rotor which is to be tested is coupled in a torque-transmitting manner to an activating motor, is set in rotation and vibrations of the rotor are measured. The invention also relates to an activating motor for use in a measuring arrangement to measure vibrations of a rotatably mounted rotor.

SUMMARY OF INVENTION

A steam turbine as an embodiment of a fluid flow machine is usually operated at 50 Hz when this steam turbine is intended for the European electrical energy supply network or at 60 Hz when this steam turbine is intended for the US American electrical energy supply network. Moreover, when such a steam turbine is coupled to a four-pole generator, the rotational speeds occurring in operation are 25 Hz with regard to the European electrical energy supply network or 30 Hz with regard to the US American electrical energy supply network.

In operation, rotors in fluid flow machines can experience vibrational excitations which can lead to oscillations, which subsequently leads to a failure of the rotor or blades and therefore of the fluid flow machine. Water turbines, steam and gas turbines, wind turbines, circulating pumps and circulating compressors as well as propellers are grouped under the collective term fluid flow machine. Common to all these machines is that they are used for the purpose of extracting energy from a fluid in order to drive another machine or conversely to feed energy to a fluid in order to increase its pressure.

Rotors of steam turbines, in particular rotors with blades or blade rings, can be excited to torsional vibrations when operating at certain rotational speeds. The vibrations are undesirable and frequently occur at so-called torsion-critical rotational speeds. The blades or blade rings often only form a combined group as a result of centrifugal forces which occur during operation. It is difficult to determine the torsion-critical rotational speeds experimentally during product development or during manufacture. This means that such rotors are designed with great uncertainty regarding torsion-critical natural frequencies. When, for example, the steam turbine is coupled as intended to a generator and/or a gas turbine and therefore forms an overall train, the vibrations can be measured.

Before a rotor is installed as intended in a fluid flow machine and subsequently put into operation, test runs of the rotor in a so-called overspeed bunker are usually required to test whether the rotor meets the desired quality requirements. For this purpose, the rotor is arranged in the overspeed bunker so that it can rotate and is set in rotation by an activating motor. The vibrations of the rotor are determined with measuring sensors, and the measured data recorded are stored and evaluated. Only if the rotor withstands certain rotational speeds and acceleration forces can it be released for delivery.

Torsion-critical natural frequencies inherently occur in complex rotationally symmetrical systems. If a rotor is operated at an excitation frequency which is close to the natural frequency, damage can be caused to the rotor, the blades and to the steam turbine.

It is often not established that a rotor system exhibits vibrations at torsion-critical rotational speeds which could lead to damage until it is operated as intended.

It would be desirable if a method for testing rotors were available with which torsion-critical rotational speeds could be simulated.

At this point the invention takes effect, the An object of which is the invention is to specify a method for testing rotors with which it is possible to measure vibrations of a rotor which occur in operation.

A further object of the invention is to specify an activating motor which can be used in a measuring arrangement with which the vibrational behavior of a rotor can be measured.

This object is achieved by a method for testing rotors, wherein a rotor which is to be tested is coupled in a torque-transmitting manner to an activating motor, is set in rotation and vibrations of the rotor are measured, wherein the activating motor is operated in such a way that torsional excitations are generated in the rotor.

The invention starts from the aspect that vibrations of the rotor at torsion-critical rotational speeds can be determined when the rotor is operated by an activating motor in such a way that torsional excitations are generated. For this purpose, the rotor including an activating motor is set in rotation at rotational speeds which are constant with respect to time and the vibration of the rotor is measured by means of measuring sensors.

Advantageous developments are contained in the dependent claims.

The object directed toward the activating motor is achieved by an activating motor for use in a measuring arrangement to measure a rotatably mounted rotor, wherein the activating motor is designed in such a way that the torque which can be transmitted from the activating motor has a component which is constant with respect to time and a component which is variable with respect to time.

It is advantageous for the method when the torsional excitations are generated such that, as well as a component which is constant with respect to time, the torque transmitted from the activating motor to the rotor also has a component which is variable with respect to time. This has the advantage that it is possible to simulate torsional excitations which occur or can be expected in normal operation.

It is advantageous when the components which are variable with respect to time can be described by a harmonic function. Among other things, this has the advantage that from experience harmonic functions lead to damaging excitation frequencies which can occur in operation.

The torque which is transmitted to the rotor from the activating motor is described by the following equation:

$$M(t)=M_0+M_A \times \sin(\omega(t) \times t).$$

It is shown to be advantageous when, at a fixed rotational speed of the rotor, the frequency $\omega(t)$ is varied from a starting value to a target value, wherein the amplitude $M_A$ remains constant. It is likewise advantageous when the amplitude is varied and the frequency $\omega(t)$ is again varied from a starting value to a target value. It is likewise advantageous when the rate of change of the frequency from the starting value to the target value can be varied.

BRIEF DESCRIPTION OF THE DRAWINGS

Exemplary embodiments of the invention are described below with reference to the drawings. In detail, in the drawing.

DETAILED DESCRIPTION OF INVENTION

Figure 1:
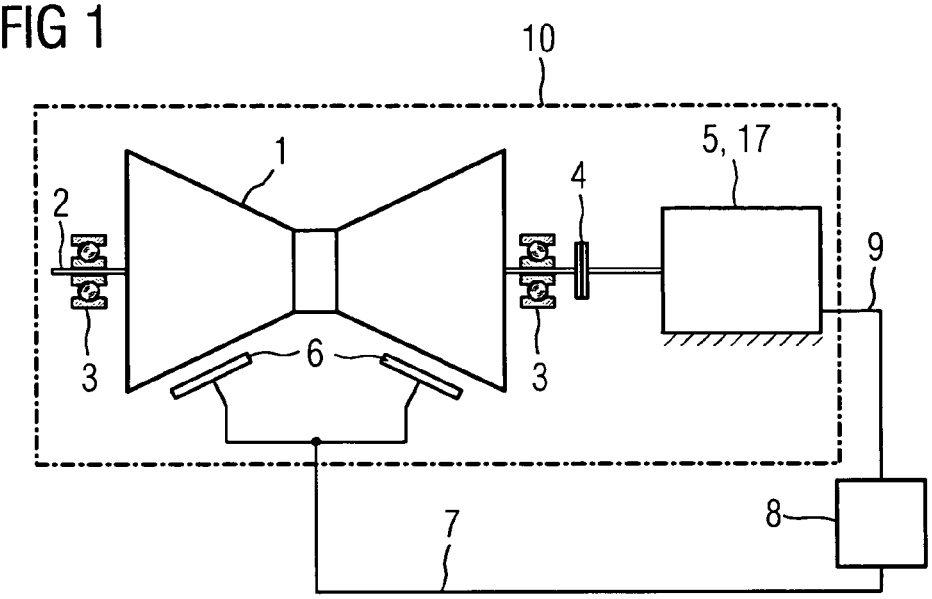
FIG. 1 shows a schematic representation of a measuring arrangement of integrated drive motor and activating motor.
Figure 2:
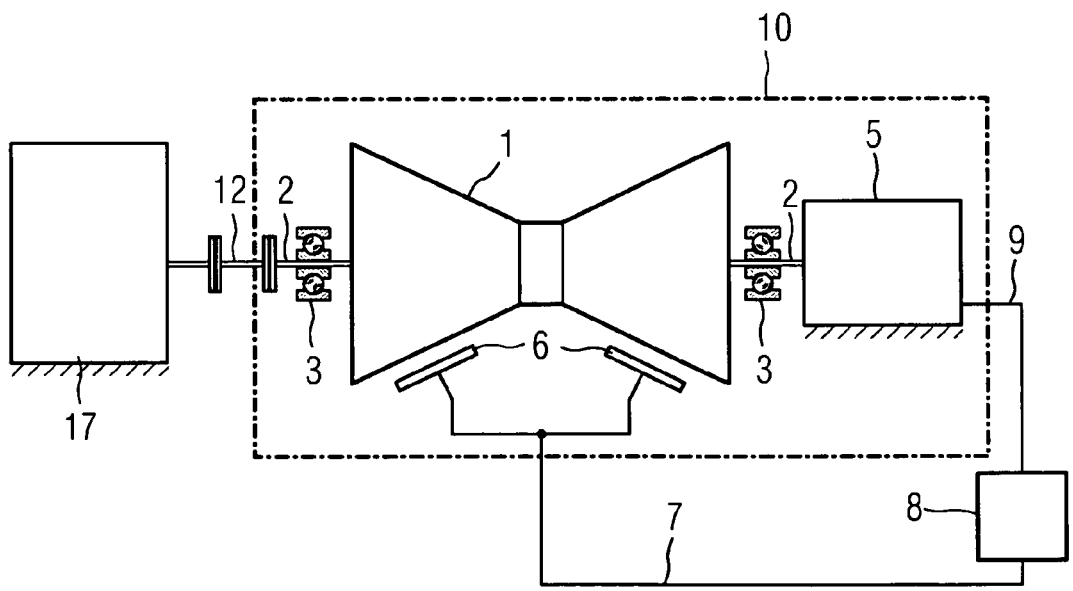
FIG. 2 shows a schematic representation of a measuring arrangement with a separate drive motor and activating motor.

A rotor 1 of a fluid flow machine is shown in schematic form in FIG. 1 and in FIG. 2. The fluid flow machine can be a high-pressure, medium-pressure or low-pressure steam turbine or a gas turbine. The rotor 1 is rotatably mounted about an axis of rotation 2 and supported on bearings 3. The rotor 1 can be supported on the bearings 3 with or without rotor blades.

The rotor 1 is coupled in a torque-transmitting manner to an activating motor 5 by means of a coupling 4. The activating motor 5 can be designed in the form of an electric servo motor.

In the embodiment of FIG. 1, the activating motor 5 for generating the torsional excitation and the drive motor 17 for turning the rotor 1 are integrated.

Alternatively, the drive motor 17 can be separated from the activating motor 5 so that the rotor 1 and the activating motor 5 are turned by the drive motor 17 which is designed as a rotary motor. For this purpose, the rotary motor is rigidly connected to the rotor 1 for transmitting torque but soft-decoupled torsionally. FIG. 2 shows the schematic structure.

Vibrations of the rotor and blades are measured by means of measuring sensors 6 and passed to a control and evaluation unit 8 via data cables 7.

The excitation frequency and the rotational speed of the activating motor 5 can be controlled separately via the control and evaluation unit 8 and via the control cable 9. The coupling 4, the rotor 1, the bearings 3 and the activating motor 5 are usually arranged in an overspeed bunker 10. The interior of the overspeed bunker 10 is evacuated with vacuum pumps in such a way that vacuum-like conditions prevail in the interior of the overspeed bunker 10.

In the test method, the rotor 1 which is to be tested is coupled in a torque-transmitting manner to the activating motor 5 and set in rotation by the activating motor 5 or alternatively by the drive motor 11. The vibrations of the rotor 1 or of the blades arranged on the rotor 1 are measured by the vibration sensors 6. At the same time, the activating motor 5 is operated in such a way that torsional excitations are generated in the rotor 1. The torsional excitations are generated such that, as well as a component which is constant with respect to time, the torque transmitted from the activating motor 5 to the rotor 1 also has a component which is variable with respect to time.

The component which is variable with respect to time is chosen here to be a harmonic function. As well as a frequency, the component which is variable with respect to time also has an amplitude. With the help of the activating motor 5, it is possible to generate torsional excitations of an appropriate magnitude and with the required dynamics so that the rotor 1 and the blades execute measurable oscillations.

The activating motor 5 transmits a torque to the rotor 1 according to the following equation:

$$M(t) = M_0 + M_A \times \sin(\omega(t) \times t).$$

It is particularly advantageous when, at a fixed rotational speed of the rotor, the frequency $\omega(t)$ is varied from a starting value to a target value, wherein the amplitude $M_A$ remains constant.

Figure 3:
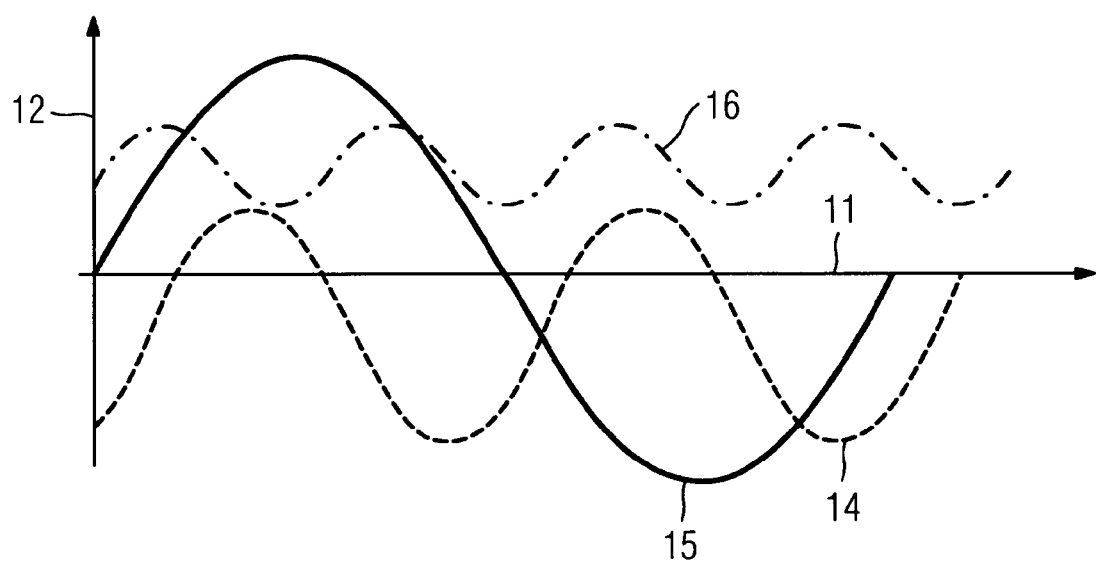
FIG. 3 shows a representation of three harmonic excitation functions of the activating motor.

By way of example, three characteristics of the rotational speed of the activating motor with respect to time are shown in FIG. 3. Time is plotted on the X-axis 11 and the variable part of the torque transmitted to the rotor 1 is shown on the Y-axis 12. In trouble-free operation, no component of the torque which is variable with respect to time can be observed. Only in operation do harmonic vibrations usually occur in the form of a component which is variable with respect to time. Such harmonic vibrations 14, 15, 16 are usually sine or cosine functions. It is likewise advantageous when the amplitude $M_A$ of the component which is variable with respect to time is varied and the frequency $\omega(t)$ is again varied from a starting value to a target value.

The activating motor 5 is designed in such a way that the torque which can be transmitted from the activating motor 5 has a component which is constant with respect to time and a component which is variable with respect to time. The component which is variable with respect to time can be a harmonic function. Using the method according to the invention, it is easily possible to control the amplitudes and frequencies for large and small rotors 1 over a wide range. The measured vibrations and rotational speeds are recorded and evaluated in the control and evaluation unit 8 for quality assurance purposes.

The invention claimed is:

1. A method for testing rotors, comprising:
   coupling a rotor to be tested in a torque-transmitting manner to an electric activating motor;
   setting the rotor in rotation by the activating motor;
   operating the activating motor such that torsional excitations are generated in the rotor; and
   measuring vibrations of the rotor,
   wherein a transmitted torque has a first component which is constant with respect to time and a second component which is variable with respect to time,
   wherein the first component is achieved with an electric drive motor and the second component is achieved with the activating motor.

2. The method as claimed in claim 1, wherein the component which is variable with respect to time is a harmonic function.

3. The method as claimed in claim 1, wherein the component which is variable with respect to time exhibits an amplitude.

4. The method as claimed in claim 1, wherein the activating motor transmits the torque to the rotor according to the following equation:

$$M(t) = M0 + MA \times \sin(\omega(t) \times t), \text{ wherein}$$

M0=Torque which is constant with respect to time,
MA=Amplitude of the component which is variable with respect to time,
$\omega(t)$=Frequency which is variable with respect to time.

5. The method as claimed in claim 4, wherein the frequency $\omega(t)$ is varied from a starting value to a target value at a fixed rotational speed of the rotor and the amplitude MA remains constant.

6. The method as claimed in claim 5, wherein the amplitude MA is varied and the frequency $\omega(t)$ is again varied from a starting value to a target value.

7. The method as claimed in claim 1, wherein blades are arranged on the rotor and vibrations of the blades are measured.

8. A measuring arrangement to measure vibrations of a rotatably mounted rotor, wherein the measuring arrangement comprises:
- an electric drive motor and an electric activating motor,
- wherein torque transmitted from the activating motor to a rotor has a component which is variable with respect to time, and
- wherein torque transmitted from the drive motor has a component which is constant with respect to time.

9. The arrangement as claimed in claim 8, wherein the component which is variable with respect to time is a harmonic function.

10. The arrangement as claimed in claim 8, wherein the torque is transmitted according to the following equation:

$$M(t)=M0+MA\times\sin(\omega(t)\times t), \text{ wherein}$$

M0=Torque which is constant with respect to time,
MA=Amplitude of the component which is variable with respect to time,
ω(t)=Frequency which is variable with respect to time.

11. The arrangement as claimed in claim 8, wherein the frequency ω(t) varies from a starting value to a target value at a fixed rotational speed of the rotor.

12. The arrangement as claimed in claim 8, wherein the amplitude MA varies.

* * * * *

UNITED STATES PATENT AND TRADEMARK OFFICE
CERTIFICATE OF CORRECTION

PATENT NO. : 8,261,616 B2
APPLICATION NO. : 12/309545
DATED : September 11, 2012
INVENTOR(S) : Bernd Lüneburg It is certified that error appears in the above-identified patent and that said Letters Patent is hereby corrected as shown below:

In claim 11, col. 6, line 9, remove [11. The arrangement as claimed in claim 8,] and insert
--11. The arrangement as claimed in claim 10,--.

In claim 12, col. 6, line 12, remove [12. The arrangement as claimed in claim 8,] and insert
--12. The arrangement as claimed in claim 10,--.

Signed and Sealed this
Twelfth Day of February, 2013

Teresa Stanek Rea
*Acting Director of the United States Patent and Trademark Office*